US012791195B2

(12) United States Patent
Hamer et al.

(10) Patent No.: US 12,791,195 B2
(45) Date of Patent: Nov. 10, 2026

(54) DEPLOYABLE KITCHEN WITH AN EXHAUST ASSEMBLY

(71) Applicant: Babington Technology, Inc., Rocky Mount, NC (US)

(72) Inventors: Andrew Hamer, Annapolis, MD (US); Joseph E. Robb, Holly Springs, NC (US); Gary D. Wasson, Cadillac, MI (US)

(73) Assignee: Babington Technology, Inc., Rocky Mount, NC (US)

( * ) Notice: Subject to any disclaimer, the term of this patent is extended or adjusted under 35 U.S.C. 154(b) by 300 days.

(21) Appl. No.: 18/630,312

(22) Filed: Apr. 9, 2024

(65) Prior Publication Data

US 2024/0344712 A1 Oct. 17, 2024

Related U.S. Application Data

(60) Provisional application No. 63/459,126, filed on Apr. 13, 2023.

(51) Int. Cl.
*F24C 15/20* (2006.01)
*B60N 3/16* (2006.01)

(52) U.S. Cl.
CPC ................ *F24C 15/20* (2013.01); *B60N 3/16* (2013.01)

(58) Field of Classification Search
CPC ......... F24C 15/2042; F24C 15/20; B60N 3/16
See application file for complete search history.

(56) References Cited

U.S. PATENT DOCUMENTS

| | | | |
|---|---|---|---|
| 1,491,158 | A | 4/1924 | Metcalfe |
| 1,681,421 | A | 8/1928 | Mccabe |
| 2,994,520 | A | 8/1961 | Sherman |
| 3,747,586 | A | 7/1973 | Weiss |
| 3,751,210 | A | 8/1973 | Babington et al. |
| 3,764,255 | A | 10/1973 | Hagel et al. |
| 4,089,327 | A | 5/1978 | Welsh |
| 4,125,354 | A | 11/1978 | Andrews |
| 4,138,062 | A | 2/1979 | Graden |
| 4,175,538 | A | 11/1979 | McCarty |
| 4,385,620 | A | 5/1983 | Black |
| 4,422,437 | A | 12/1983 | Hirschey |
| 4,601,509 | A | 7/1986 | Ellis, Sr. |
| 4,919,477 | A | 4/1990 | Bingham |
| 5,232,010 | A | 8/1993 | Rozenblatt et al. |
| 5,267,552 | A | 12/1993 | Squires et al. |
| 5,285,604 | A | 2/1994 | Carlin |
| 5,312,296 | A | 5/1994 | Aalto et al. |
| 5,364,221 | A | 11/1994 | Theurer et al. |
| 5,647,342 | A | 7/1997 | Jamieson et al. |

(Continued)

FOREIGN PATENT DOCUMENTS

| | | | |
|---|---|---|---|
| DE | 3225932 | A1 | 1/1984 |
| GB | 579420 | A | 8/1946 |
| GB | 2147788 | A | 5/1985 |

*Primary Examiner* — Alfred Basichas
(74) *Attorney, Agent, or Firm* — Mills IP Law, PLLC

(57) ABSTRACT

A deployable kitchen includes an enclosure, a lateral wall, and then exhaust assembly. The exhaust assembly is positioned within the enclosure and is configured to receive a cooking exhaust and a combustion exhaust from an appliance. The exhaust assembly includes an exhaust hood, an exhaust plenum, a blower, an outer duct, and an inner duct. The outer duct is configured to receive the cooking exhaust. The inner duct is positioned within the outer duct and is positioned to receive the combustion exhaust.

20 Claims, 9 Drawing Sheets

(56) References Cited

U.S. PATENT DOCUMENTS

| | | | |
|---|---|---|---|
| 5,669,374 | A | 9/1997 | Valters et al. |
| 5,771,879 | A | 6/1998 | Saltzman |
| 5,833,295 | A | 11/1998 | Farlow, Jr. |
| 6,431,628 | B1 | 8/2002 | Bell, Jr. |
| 7,100,599 | B2 | 9/2006 | Babington |
| 7,638,738 | B1 | 12/2009 | Babington |
| 7,798,138 | B2 | 9/2010 | Babington |
| 8,464,704 | B2 | 6/2013 | Brown |
| 8,499,755 | B2 | 8/2013 | Babington et al. |
| 8,622,737 | B2 | 1/2014 | Babington |
| 9,234,659 | B2 | 1/2016 | Babington |
| 9,447,966 | B2 | 9/2016 | Babington |
| 9,822,982 | B2 | 11/2017 | Babington et al. |
| 10,197,276 | B2 | 2/2019 | Babington et al. |
| 10,302,299 | B2 | 5/2019 | Babington et al. |
| 10,322,661 | B2 | 6/2019 | Babington et al. |
| 10,845,053 | B2 | 11/2020 | Babington et al. |
| 11,105,504 | B2 | 8/2021 | Babington et al. |
| 11,796,171 | B2 | 10/2023 | Babington et al. |
| 12,031,721 | B2 | 7/2024 | Babington et al. |
| 2003/0173057 | A1 | 9/2003 | Yan |
| 2009/0151711 | A1 | 6/2009 | Wells et al. |
| 2010/0139641 | A1 | 6/2010 | Distaso |
| 2024/0318835 | A1 | 9/2024 | Hamer et al. |
| 2024/0367574 | A1 | 11/2024 | Hague et al. |

DEPLOYABLE KITCHEN WITH AN EXHAUST ASSEMBLY

CROSS-REFERENCE TO RELATED APPLICATIONS

This application claims benefit of priority to of U.S. Provisional Application Ser. No. 63/459,126, entitled "A Deployable Kitchen with an Exhaust Assembly," filed Apr. 13, 2023, which is incorporated herein by reference in its entirety.

BACKGROUND

The embodiments described herein relate generally to deployable kitchens, and more particularly to systems and methods for managing exhaust from appliances within the deployable kitchen.

It is often necessary to cook for significant numbers of people at locations that do not have access to permanent kitchen facilities. For example, military units need deployable kitchens to support operations when personnel are deployed away from fixed facilities. Such deployable kitchens should be capable of preparing and feeding a large number of troops in a short period of time (e.g., more than 500 meals within less than three hours). Such deployable kitchens should also be energy efficient to conserve limited amounts of fuel, water, and other resources that may be available for field feeding. As another example, disaster relief operations need transportable kitchen appliances to provide food service for disaster zones and relief centers. Additionally, restaurants and caterers may use deployable kitchens to cook at remote locations, such as beaches, wooded areas, street fairs, etc.

Some known deployable kitchens include appliances for food preparation within a truck or trailer that can be transported to the area of need. Other known deployable kitchens can be housed within a standardized shipping container (e.g., a 20-ft International Organization for Standardization (ISO) container). Such deployable kitchens are referred to as containerized kitchens and can include movable walls (referred to as wings or wing walls) that allow for expanded space within the kitchen area when in the deployed configuration. Some known containerized kitchens include appliances (e.g., griddles and cooking pot assemblies) that use open flame burners to produce the heat for cooking. This can result in undesirable emissions (smoke and noxious gases) and excessive heat being produced within the kitchen environment. Accordingly, some known deployable kitchens have sought to use closed burners to facilitate exhausting the combustion products outside of the kitchen environment. Thus, a need exists for systems and methods of managing cooking and combustion exhaust produced by appliances within deployable kitchens.

SUMMARY

This summary introduces certain aspects of the embodiments described herein to provide a basic understanding. This summary is not an extensive overview of the inventive subject matter, and it is not intended to identify key or critical elements or to delineate the scope of the inventive subject matter.

In some embodiments, the deployable kitchen includes an enclosure that has a fixed floor and a fixed roof. In some embodiments, the deployable kitchen can also include at least one movable wing. The enclosure defines a longitudinal axis, a lateral axis, and a vertical axis. The deployable kitchen also includes a lateral wall within the enclosure. The lateral wall extends between the fixed floor and the fixed roof to, at least partially, define a mechanical volume within the enclosure. Additionally, the deployable kitchen includes an exhaust assembly positioned at least partially within the enclosure. The exhaust assembly is configured to receive a cooking exhaust and a combustion exhaust from an appliance within the enclosure. The exhaust assembly includes an exhaust hood, an exhaust plenum, a blower, an outer duct, and an inner duct. The exhaust hood is coupled along the lateral wall, defines a longitudinal axis that is parallel to the lateral axis of the enclosure, and is configured to receive the cooking exhaust. The exhaust plenum is coupled along the lateral wall, is positioned between the exhaust hood and the fixed floor, and is in fluid communication with the exhaust hood. The inner duct is within the outer duct and is configured to be fluidically coupled to a burner within the appliance such that the combustion exhaust flows through the inner duct. An inlet of the blower is fluidically coupled to the exhaust hood, an outlet of the blower is fluidically coupled to the outer duct, and the blower is configured to produce a flow of the cooking exhaust through the outer duct.

In some embodiments, the longitudinal axis and the vertical axis of the enclosure define a first plane. The outer duct extends along a second plane that is orthogonal to the first plane. The second plane has an angle of inclination relative to the fixed floor along the longitudinal axis of zero degrees to ten degrees. The outer duct extends parallel to the first plane.

In some embodiments, the outer duct is positioned along the vertical axis between a lowermost edge of the exhaust hood and the fixed floor.

In some embodiments, the outer duct is positioned along the vertical axis between a lowermost edge of the exhaust hood and a cooking surface of the appliance.

In some embodiments, the exhaust hood, the exhaust plenum, the blower, and the outer duct define a cooking-exhaust flow path. The cooking-exhaust flow path includes a first path portion within the exhaust hood and a second path portion within the exhaust plenum. The second path portion extends downward from the first flow path portion toward the inlet of the blower. The cooking-exhaust flow path also includes a third path portion within the blower and a fourth path portion within the outer duct. The fourth path portion extends in the longitudinal direction from the outlet of the blower.

In some embodiments, the exhaust assembly includes a combustion-exhaust duct configured to fluidically couple the appliance and the inner duct. The combustion-exhaust duct and the inner duct define a combustion-exhaust flow path. The combustion-exhaust flow path is surrounded by the cooking-exhaust flow path along at least 90% of a length of the combustion-exhaust flow path.

In some embodiments, a portion of the cooking exhaust within the cooking-exhaust flow path has a first temperature, and a portion of the combustion exhaust within combustion-exhaust flow path has a second temperature. The second temperature is greater than the first temperature, and the cooking-exhaust flow path is configured to insulate the combustion-exhaust flow path.

In some embodiments, the blower is positioned along the vertical axis between a lowermost edge of the exhaust hood and the fixed floor.

In some embodiments, the blower is positioned externally relative to the exhaust plenum and the outer duct.

In some embodiments, the exhaust hood and the exhaust plenum are positioned along a first face of the lateral wall, and the blower is positioned along a second face of the lateral wall. The second face of the lateral wall is separated from the first face of the lateral wall by a thickness of the lateral wall along the longitudinal axis of the enclosure.

In some embodiments, the inner duct and the outer duct are arranged in a nested configuration. In some embodiments, the inner duct and the outer duct are axially aligned.

In some embodiments, the inner duct has a rectangular cross-section, and the outer duct has a rectangular cross-section. An area of the rectangular cross-section of the inner duct is less than an area of the rectangular cross-section of the outer duct.

In some embodiments, an insulation layer extends longitudinally and surrounds the inner duct. In some embodiments, the insulation layer is positioned between the inner duct and the outer duct. In some embodiments, the insulation layer has a thickness of 0.75 inches to 1.25 inches.

In some embodiments, the exhaust assembly includes an exhaust outlet defined by the inner duct and the outer duct. The exhaust outlet is positioned within the mechanical volume.

In some embodiments, the exhaust outlet is positioned along the vertical axis between a lowermost edge of the exhaust hood and the fixed floor.

In some embodiments, an outlet extension removably coupled to the exhaust outlet. The outlet extension has an extension inlet in fluid communication with the exhaust outlet and an extension outlet that is positioned outside of the enclosure.

In some embodiments, the cooking exhaust received by the exhaust hood is a first cooking-exhaust portion. In such embodiments, the exhaust plenum defines a secondary intake portion positioned between a cooking surface of the appliance and a lowermost edge of the exhaust hood. The secondary intake portion is configured to receive a second cooking-exhaust portion.

In some embodiments, the inner duct includes a first duct portion that extends parallel to the outer duct. The inner duct also includes a second duct portion that extends within the exhaust plenum toward the fixed floor. The first duct portion is coupled to the second duct portion at a non-zero angle.

In some embodiments, the exhaust assembly includes a combustion-exhaust duct configured to fluidically couple the appliance and the inner duct.

In some embodiments, the exhaust plenum defines a combustion-exhaust coupling port. The combustion-exhaust coupling port is configured to facilitate fluidically coupling the appliance and the inner duct. In some embodiments, the combustion-exhaust coupling port is between a cooking surface of the appliance and the fixed floor.

In some embodiments, a face of the appliance defines a combustion-exhaust port. The combustion-exhaust port is positioned between the cooking surface of the appliance and the fixed floor.

In some embodiments, the exhaust plenum extends along the vertical axis between a lowermost edge of the exhaust hood and a vertical location between a cooking surface of the appliance and the fixed floor.

In some embodiments, the exhaust plenum extends laterally across a width of the lateral wall. The exhaust plenum occludes the lateral wall between the lowermost edge of the exhaust hood and the cooking surface. In some embodiments, the exhaust plenum has a depth extending along the longitudinal axis between the appliance and the lateral wall.

In some embodiments, the exhaust plenum defines an internal volume that is greater than 150% of an internal volume defined by the exhaust hood.

In some embodiments, the blower is a first blower, and the appliance is a first appliance. In such embodiments, the exhaust assembly includes a second blower fluidically coupled between the exhaust hood and the outer duct. The exhaust assembly is configured to receive the cooking exhaust and the combustion exhaust from the first appliance and a second appliance within the enclosure. The first appliance and the second appliance are configured to be positioned side by side along the lateral wall.

DETAILED DESCRIPTION

Figure 1:
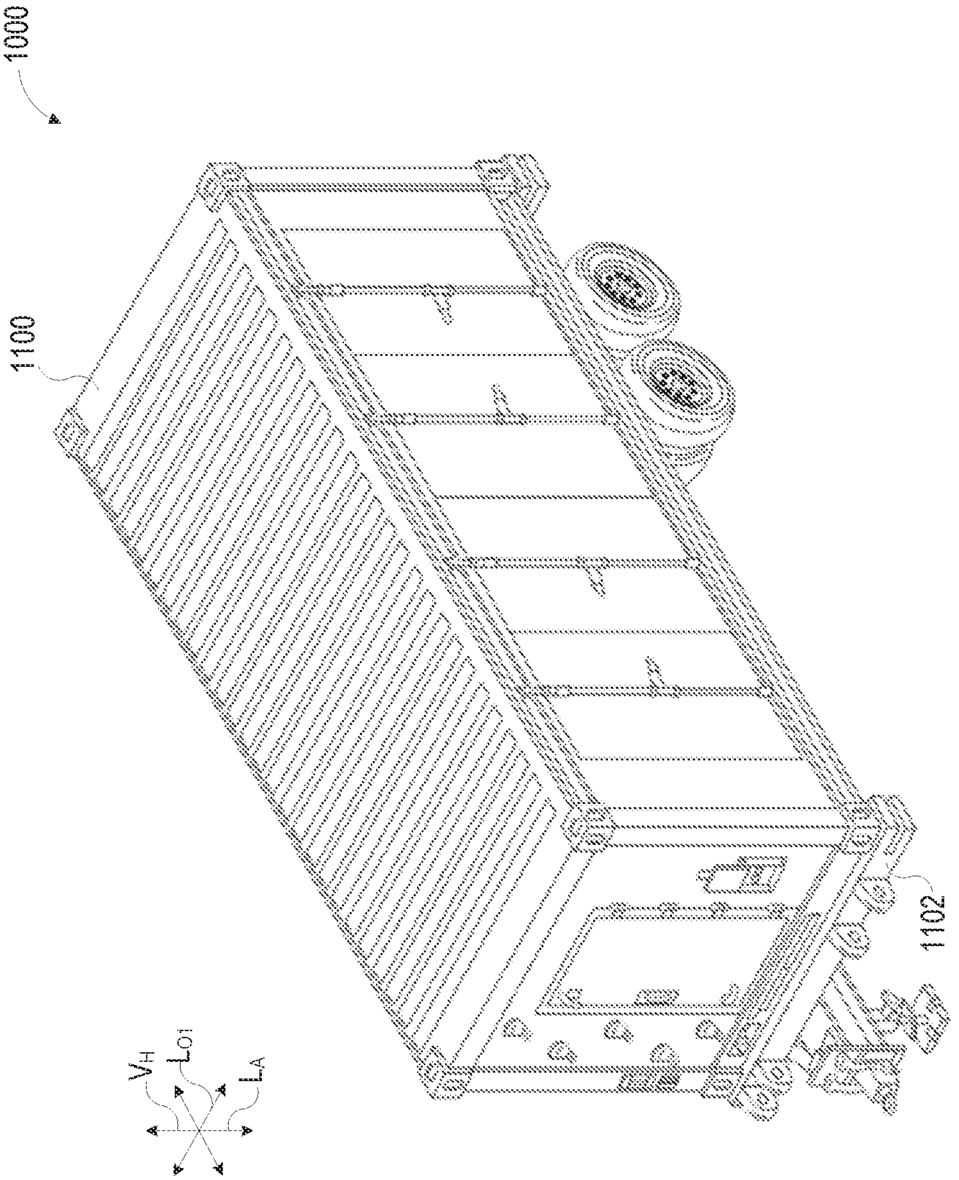
FIGS. 1 and 2 are perspective views of a deployable kitchen, according to an embodiment, in a first (i.e., storage) configuration (FIG. 1) and a second (i.e., deployed) configuration (FIG. 2).

The embodiments described herein relate to deployable kitchens with an exhaust assembly. The systems, methods, and structures disclosed herein provide for routing exhaust gases from an appliance within the deployable kitchen through an exhaust assembly. The exhaust assembly can be configured to receive both cooking exhaust and combustion exhaust from the appliance within the enclosure of the deployable kitchen. Accordingly, the exhaust assembly defines a cooking-exhaust flow path and a combustion-exhaust flow path. In some embodiments, the cooking-exhaust flow path surrounds at least a portion of the combustion-exhaust flow path in order to insulate the combustion-exhaust flow path. As such, the exhaust assembly can include an exhaust hood, an exhaust plenum, a blower, an outer duct, and an inner duct. The exhaust hood is positioned so as to be above the appliance in order to receive cooking exhaust from the appliance. The cooking exhaust is then drawn downward into the exhaust plenum and into the outer duct via the blower. The inner duct is positioned within the outer duct and is configured to receive combustion exhaust from the appliance. The cooking exhaust can, for example, have a temperature that is lower than the that of the combustion exhaust. As such, the cooking exhaust in the outer duct serves to insulate surrounding portions of the deployable kitchen from the higher temperature combustion exhaust within the inner duct.

The embodiments described herein can be included in any suitable deployable kitchen including food trucks, mobile kitchen trailers (such as the wheeled kitchens shown and described in U.S. Pat. No. 10,322,661 entitled "Mobile Kitchen," which is incorporated herein by reference in its entirety), self-contained deployable kitchens (such as the containerized kitchens used by the U.S. Army), deployable kitchens that are connectable to external power sources (such as the expeditionary field kitchens used by the U.S. Marine Corps), and any other suitable structure that includes one or more cooking appliances that can deployed.

As used herein, the term "about" when used in connection with a referenced numeric indication means the referenced numeric indication plus or minus up to 10% of that referenced numeric indication. For example, the language "about 50" covers the range of 45 to 55. Similarly, the language "about 5" covers the range of 4.5 to 5.5.

In addition, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

As used herein, specific words chosen to describe one or more embodiments and optional elements or features are not intended to limit the invention. For example, spatially relative terms-such as "beneath", "below", "lower", "above", "upper", "proximal", "distal", and the like—may be used to describe the relationship of one element or feature to another element or feature as illustrated in the figures. These spatially relative terms are intended to encompass different positions (i.e., translational placements) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes include various spatial device positions and orientations.

Similarly, geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round", a component that is not precisely circular (e.g., one that is slightly oblong or is a many-sided polygon) is still encompassed by this description.

Figure 2:
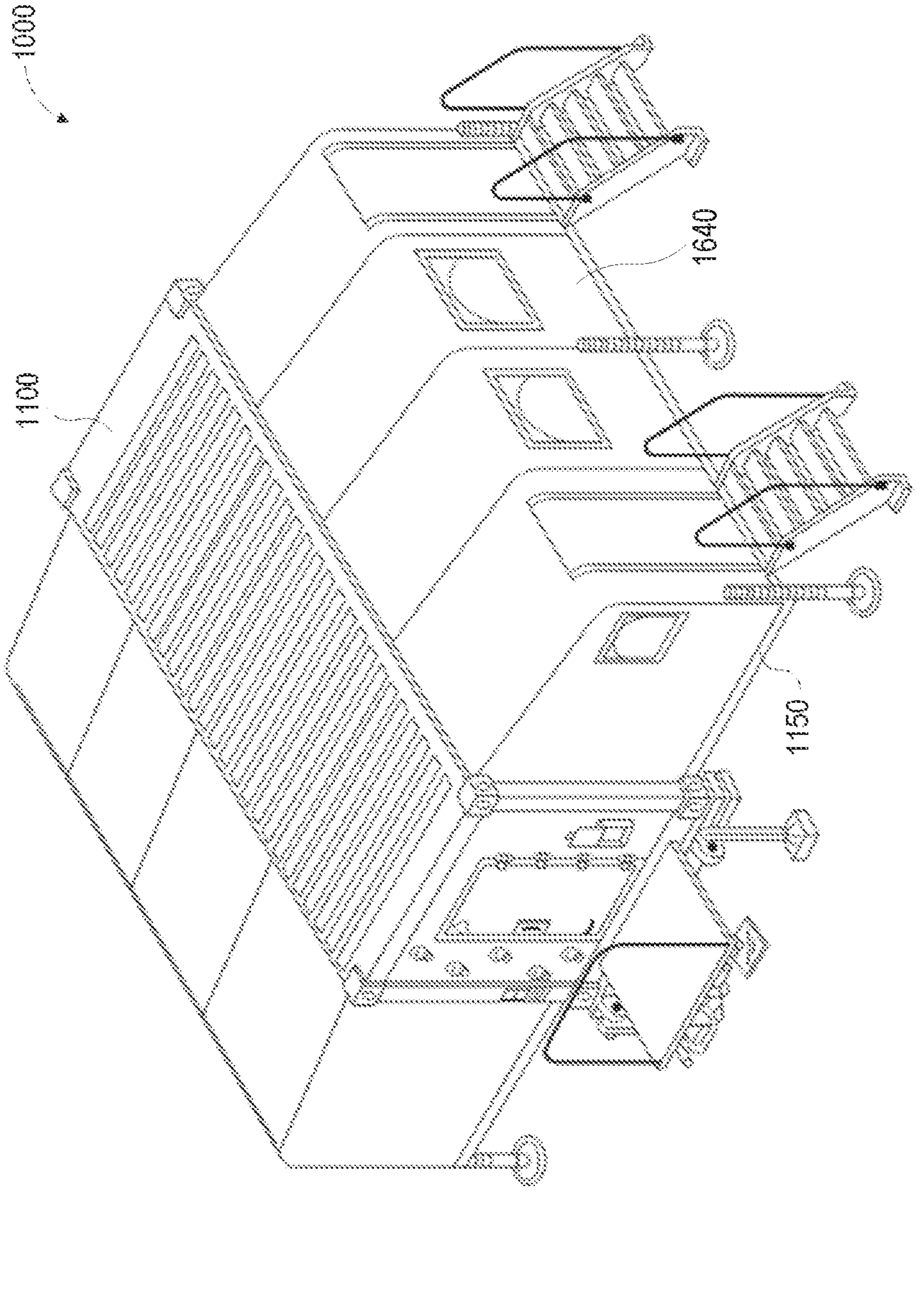

FIGS. 1 and 2 are perspective views of a deployable kitchen 1000, according to an embodiment. The deployable kitchen 1000 is configured to transition between a first (undeployed) configuration (FIG. 1) and a second (i.e., deployed) configuration (FIG. 2). When in the undeployed configuration, the deployable kitchen 1000 can be stored or transported (e.g., via ship, trailer transport, aircraft shipping, or any other suitable method of transport) for later use. Said another way, in some embodiments the deployable kitchen 1000 (e.g., a deployable field kitchen) is suitable for transport between a first location and a second location (e.g., between a garrison location and a field location). When in the deployed configuration (FIGS. 2 and 3), the deployable kitchen 1000 can be expanded to provide a service region (or volume) $S_V$ for cooking and feeding services.

Figure 3:
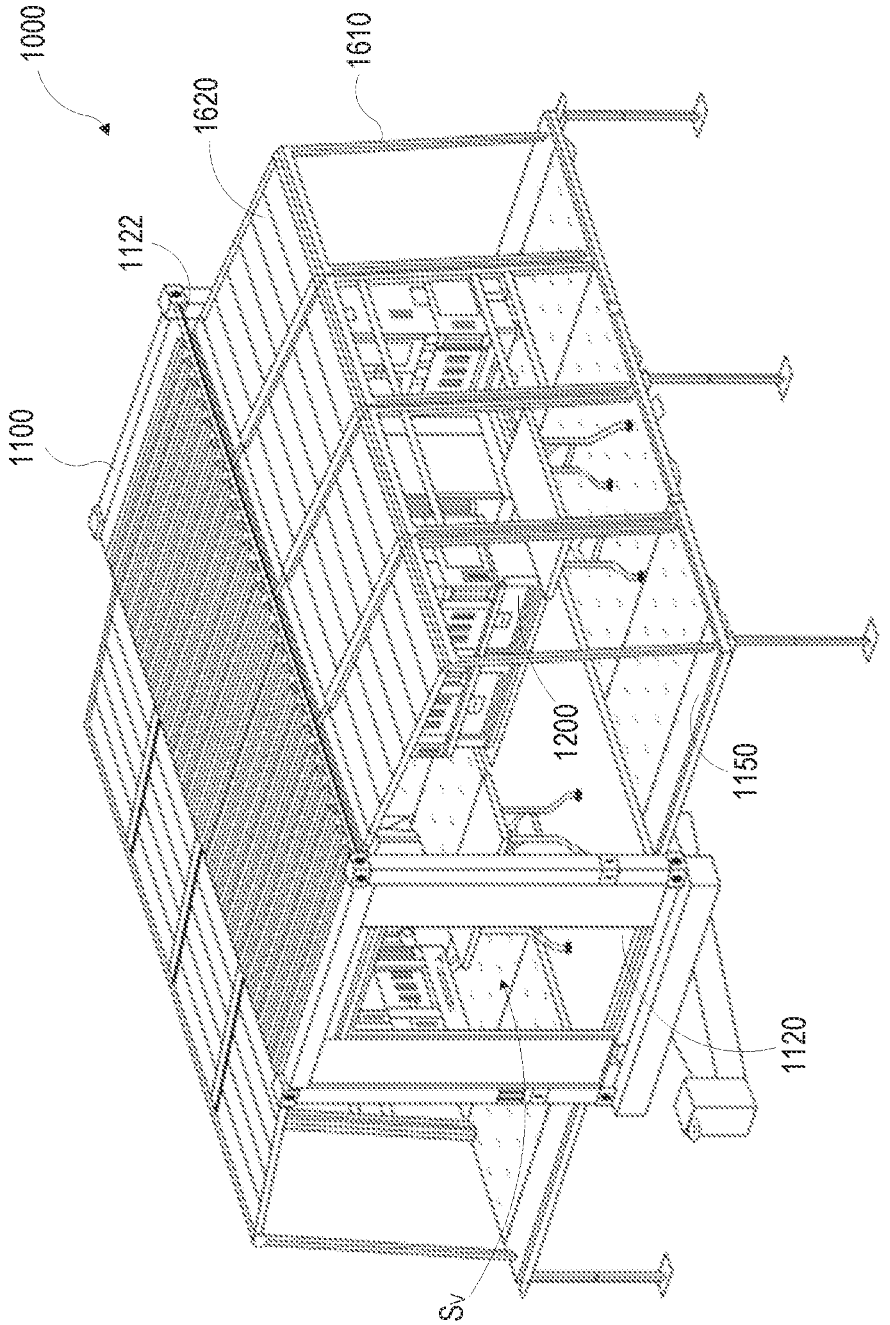
FIG. 3 is a perspective view of the deployable kitchen shown in FIGS. 1 and 2 in the second configuration, with the outer covering removed to show the internal service volume of the kitchen.

The deployable kitchen 1000 includes an enclosure 1100 that is configured to contain at least one cooking appliance 1200 and/or a sanitation station (e.g., a sink, a dishwasher, a sterilizer, and/or other similar apparatus). The deployable kitchen 1000 can also include other suitable food service components, such as preparation tables, storage racks, heating racks, and utensils. As shown in FIG. 3, the enclosure 1100 includes a fixed floor 1120, a fixed roof 1122, and movable wings 1150. The enclosure 1100 also includes a frame assembly 1610, a fabric section 1640 (see FIG. 2), and optional roof sections 1620. Referring to FIG. 1, the enclosure 1100 defines a longitudinal axis ($L_{O1}$), a lateral axis ($L_A$), and a vertical axis ($V_A$).

Figure 5:
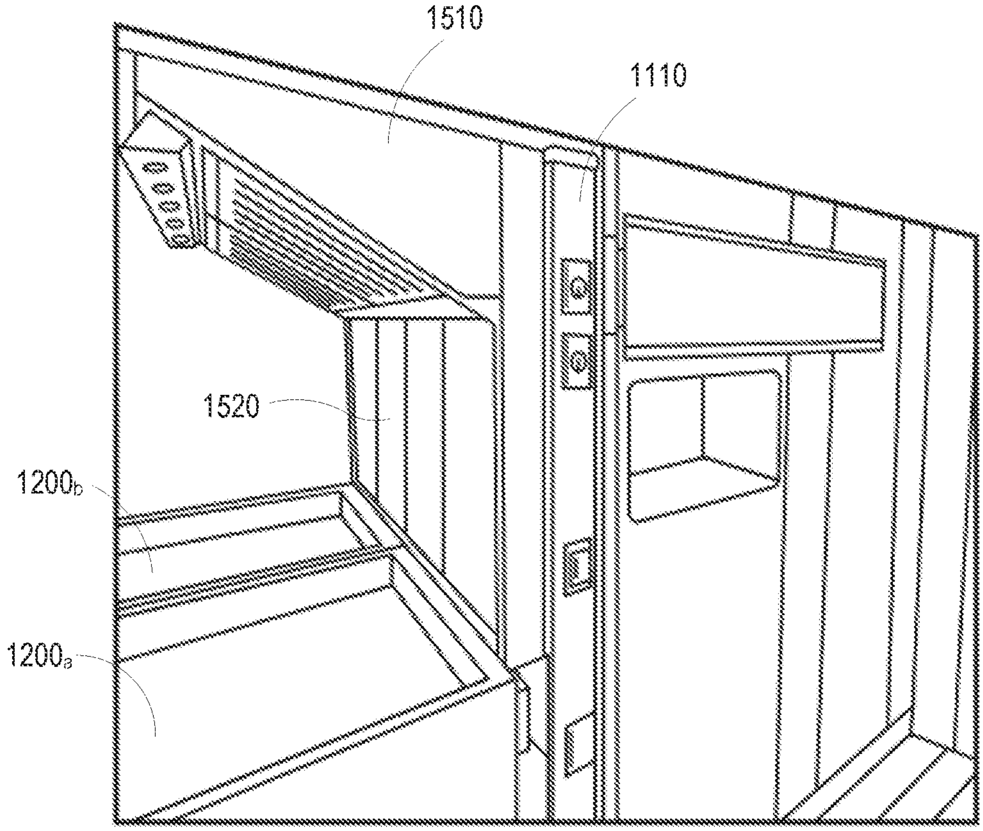
FIG. 5 is a perspective side view of the exhaust hood, the exhaust plenum, and appliances of FIG. 4 in the deployable kitchen shown in FIGS. 1 and 2.
Figure 6:
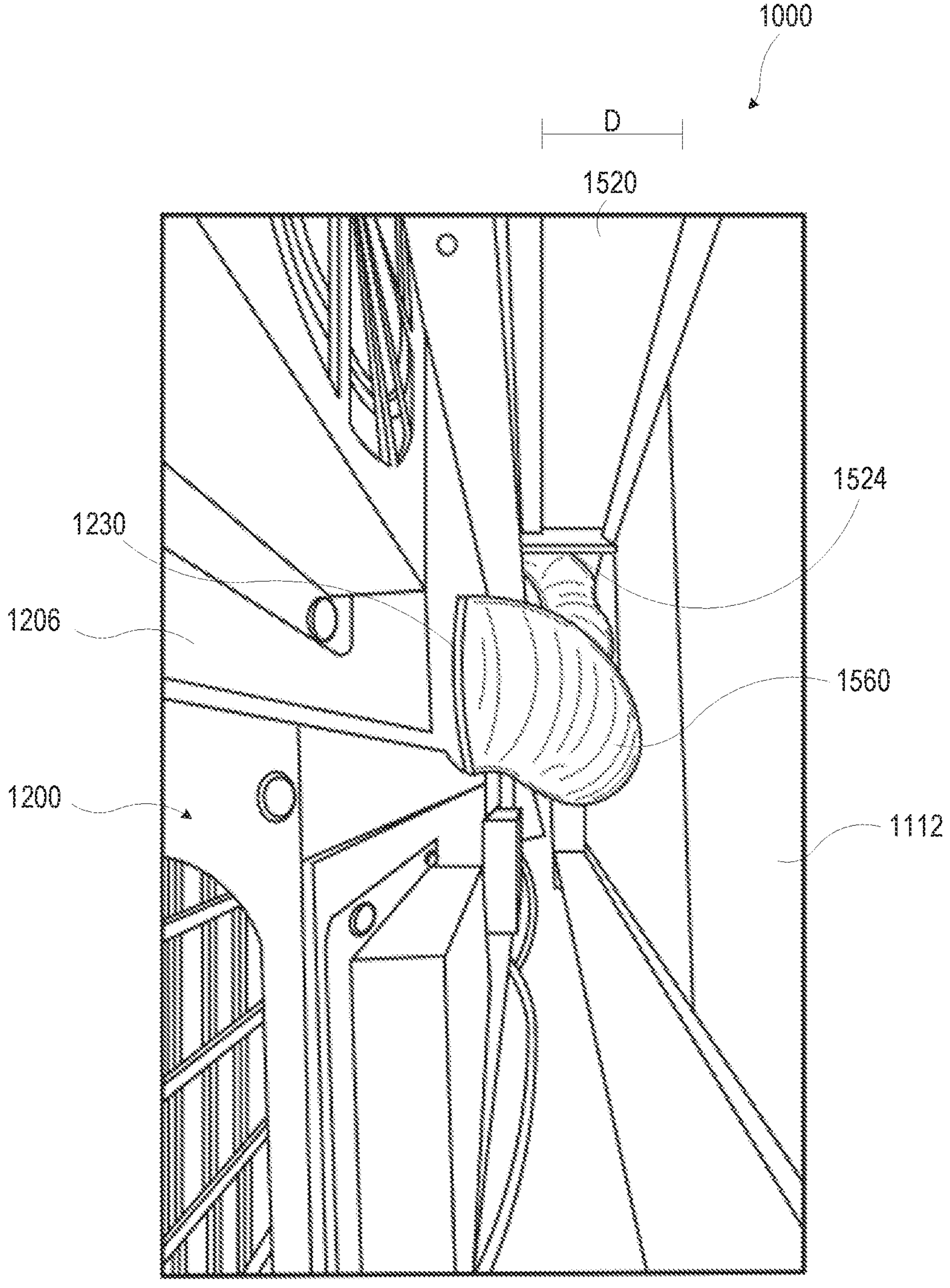
FIG. 6 is a close-up side view of the appliances of FIG. 4 illustrating a space between the appliances and a lateral wall of the deployable kitchen shown in FIGS. 1 and 2.

As depicted in FIGS. 5 and 6, in some embodiments, the deployable kitchen 1000 includes a lateral wall 1110 within the enclosure 1100. The lateral wall 1110 extends between the fixed floor 1120 and the fixed roof 1122. The lateral wall 1110 can, for example, be orthogonal to the fixed floor 1120 and/or the fixed roof 1122. The lateral wall 1110 at least partially defines a mechanical volume $M_V$ (FIG. 7) of the enclosure 1100. The mechanical volume $M_V$ can be separated within the enclosure 1100 from the service volume $S_V$ by wall structures, including the lateral wall 1110, of the enclosure 1100. Thus, the mechanical volume $M_V$ (also referred to as a mechanical room) can be separated from the service volume $S_V$ (also referred to as the serving room or food preparation area). The mechanical volume My can contain components such as a generator (not shown), air conditioner/heating units (also referred to as environmental control units), electrical panels, and all or a portion of the exhaust assemblies described herein. In this manner, the heat, noise, and spatial constraints from such components can be isolated from the service volume $S_V$ where cooking preparation and field feeding is performed. In some embodiments, the lateral wall 1110 includes a first face 1112. The first face 1112 is facing the service volume $S_V$. In some embodiments, the lateral wall 1110 includes a second face (e.g., the second face 2114 of FIG. 7). The second face is opposite the first face and is facing the mechanical volume $M_V$. The second face is separated from the first face 1112 by a thickness T (FIG. 7) along the longitudinal axis $L_{O1}$ of the enclosure 1100.

Referring again to FIGS. 1-3 in some embodiments, the movable wings 1150 are wall structures that are pivotably mounted to the fixed floor 1120, which allows for the enclosure 1100 (and the deployable kitchen 1000) to move between the first configuration (FIG. 1) and the second configuration (FIGS. 2 and 3). Specifically, the wings 1150 are each coupled to the fixed floor 1120 by a set of hinges. In this manner, the wings 1150 can move relative to the fixed floor 1120 between a wall position (FIG. 1) and a floor position (FIGS. 2 and 3). Each movable wing 1150 includes a first wing face (or surface) and a second wing face (or surface). The first wing face is an exterior wall of the enclosure 1100 on a condition that the movable wing 1150 is in the wall position. The second wing face is an interior wall on a condition that the movable wing is in the wall position. The second wing face also functions as a floor portion on a condition that the movable wing 1150 is in the floor position (FIGS. 2 and 3).

In some embodiments, the enclosure 1100 is constructed to meet the dimensional requirements of ISO Standards 661 and 1161 when the enclosure is in the first configuration. In this manner the deployable kitchen 1000 can be easily transported by truck, rail, sea, or air. Moreover, the enclosure can be constructed from materials and can have the moisture sealing and structural integrity to comply with Coast Guard requirements for shipment by sea, and arrangement in a stacked configuration.

Figure 4:
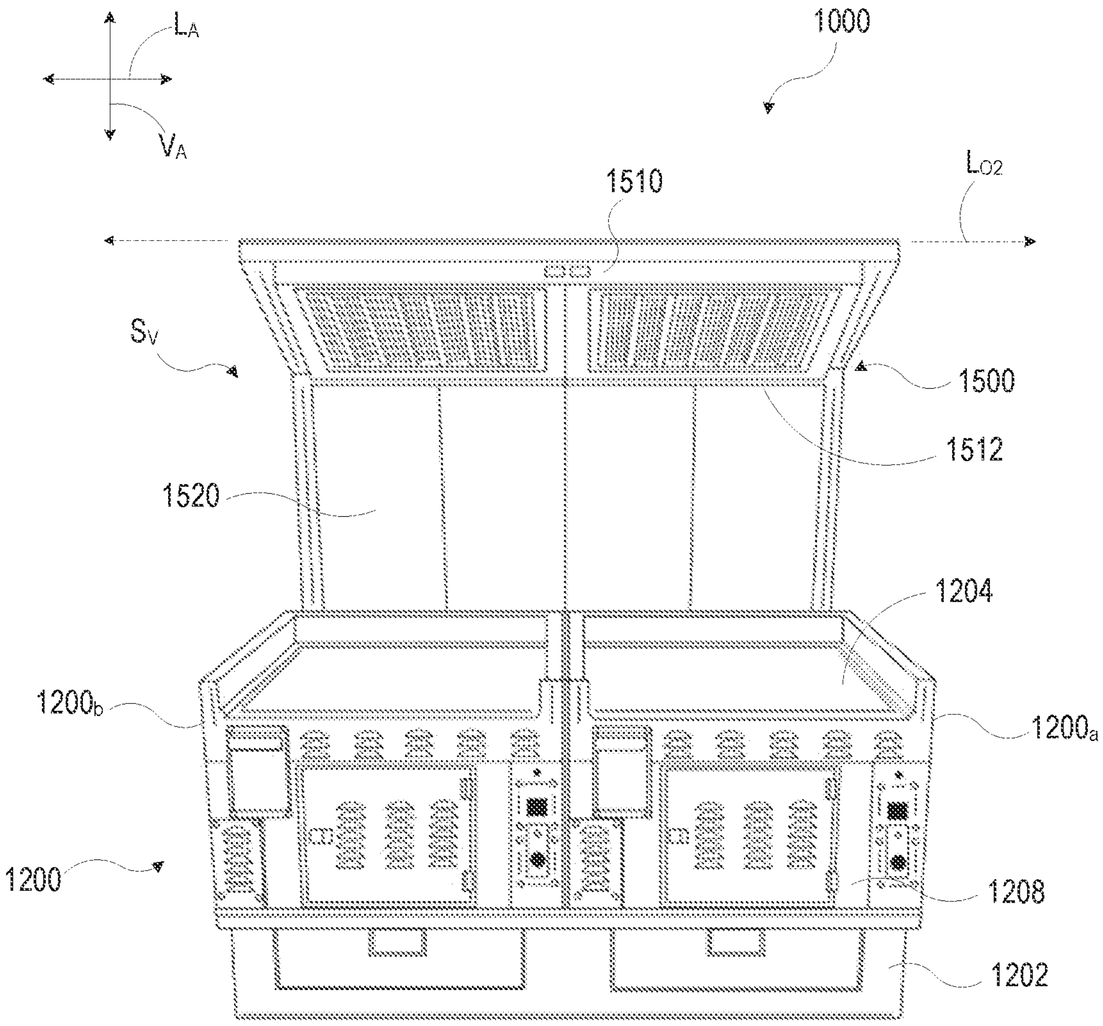
FIG. 4 is a perspective view of an exhaust hood, an exhaust plenum, and appliances of the deployable kitchen shown in FIGS. 1 and 2.

The enclosure can include any suitable appliance. One example is shown in FIGS. 4-6, which shows an appliance (or appliance assembly) 1200 (e.g., a first appliance 1200*a* and a second appliance 1200*b*) that includes an appliance housing 1202 that contains a burner unit (not shown in FIG. 4, but shown schematically as the burner unit 2210 in FIG. 7). Thus, the appliance 1200 is a closed burner system and the combustion gas can be exhausted via an exhaust assembly 1500, which reduces the heat load within the service volume $S_V$ of the enclosure 1100. Each appliance housing 1202 includes a cooking surface 1204, a front face 1208, a rear face 1206, and two side faces. The appliance housing 1202 can define one or more cooling passages that at least partially surrounds the burner unit. As shown, the front face 1208 can include air inlets and the rear face 1206 can include air outlets for the cooling passage(s) within the appliance housing 1202. Thus, in use, airflow within the appliance housing 1202 can provide an insulative effect to prevent the appliance housing 1202 from reaching undesirably high temperatures. Similarly stated, airflow within the appliance housing 1202 can establish an air buffer between the burner unit and the appliance housing 1202 on a condition that the appliance 1200 is in an operating state.

Although the appliance 1200 is shown as a griddle, in other embodiments, the appliance 1200 (and any of the appliances described herein) can be any suitable cooking appliance, such as a cooking pot heater, an oven, a warming rack, a tray ration heater, or the like. In some embodiments, the appliance 1200 can be a serving appliance, such as a heated serving line. In some embodiments, the appliance 1200 can be a cleaning and/or sanitation appliance, such as a field sanitation unit. In some embodiments, the deployable kitchen 1000 can include various combinations of any of the appliances described herein.

The deployable kitchen 1000 includes an exhaust assembly 1500 positioned at least partially within the enclosure 1100. The exhaust assembly 1500 is configured to receive a cooking exhaust and a combustion exhaust from the appliance 1200 within the enclosure 1100. As depicted in FIG. 4, the exhaust assembly 1500 includes an exhaust hood 1510 and an exhaust plenum 1520. Although not depicted in FIG. 4, in some embodiments, the exhaust assembly 1500 also includes a blower, an outer duct, and an inner duct (e.g., blower 2530, outer duct 2540, and inner duct 2550 of FIG. 7).

As depicted in FIGS. 4 and 5, in some embodiments, the exhaust hood 1510 is coupled along the lateral wall 1110. The exhaust hood 1510 can, for example, be coupled along the lateral wall 1110 by an intervening structure and, thus, need not be directly coupled to the lateral wall 1110. The exhaust hood 1510 defines a primary axis $L_{O2}$. The primary axis $L_{O2}$ of the exhaust hood 1510 is parallel to the lateral axis $L_A$ of the enclosure 1100. Said another way, the exhaust hood 1510 is arranged orthogonal to the longitudinal axis $L_{O1}$ of the enclosure 1100 rather than parallel thereto. It should be appreciated that arranging the exhaust hood 1510 orthogonal to the longitudinal axis $L_{O1}$ of the enclosure 1100 can preclude obstructing headspace within the service volume $S_V$ of the enclosure 1100. The unobstructed headspace can then be used for other functions of the deployable kitchen 1000 and/or maintained in the interest of occupant comfort. For example, in some embodiments, the absence of the exhaust hood 1510 along the longitudinal axis $L_{O1}$ of the enclosure 1100 allows for the unobstructed headspace to be used for other ducting (e.g., from an environmental control unit), lighting, or simply greater clearance for the occupants of the enclosure 1100.

Figure 7:
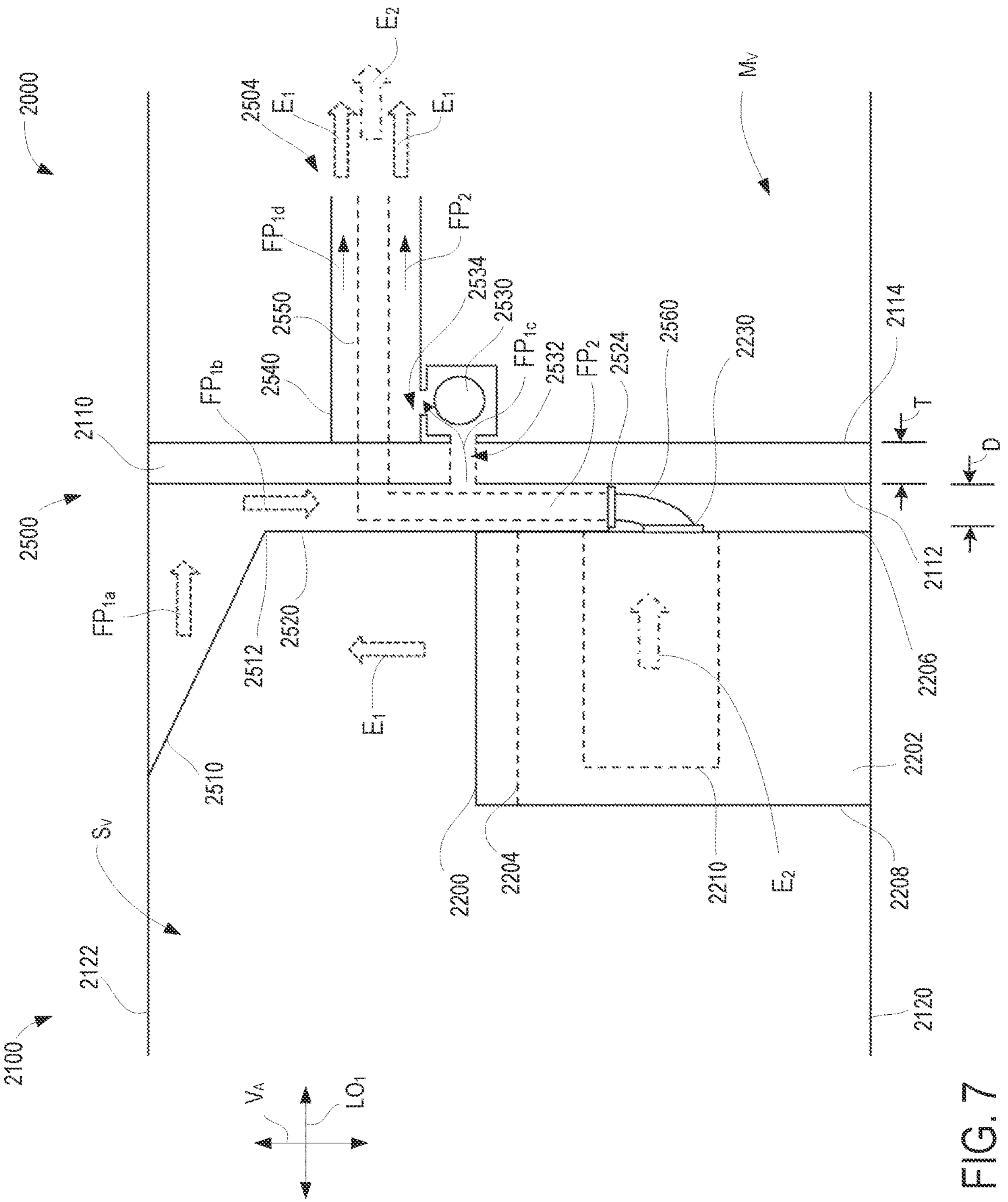
FIG. 7 is a side view schematic illustration of a portion of a deployable kitchen with an appliance fluidically coupled to an exhaust assembly according to an embodiment.

The exhaust hood 1510 is configured to receive the cooking exhaust (not shown in FIG. 4, but see e.g., cooking exhaust $E_1$ as depicted in FIG. 7) from the appliance 1200 when the appliance 1200 is in operation. The cooking exhaust can include heat, particulate matter, gases, and/or water vapor rising from the cooking surface 1204 of the appliance 1200 during operation. The cooking exhaust can, for example, have a temperature that is in the range of 100° F. to 200° F. (e.g., approximately 150° F.).

As depicted in FIGS. 4-6, in some embodiments, the exhaust plenum 1520 is coupled along the lateral wall 1110. The exhaust plenum 1520 is positioned between the exhaust hood 1510 and the fixed floor 1120 of the enclosure 1100. Said another way, the exhaust plenum 1520 is positioned vertically below the exhaust hood 1510. In some embodiments, the exhaust plenum 1520 and the exhaust hood 1510 are positioned along the first face 1112 of the lateral wall 1110. The exhaust plenum 1520 is in fluid communication with the exhaust hood 1510. Accordingly, the exhaust plenum 1520 facilitates a flow of the cooking exhaust in a downward direction toward the fixed floor 1120 after being received by exhaust hood 1510.

In some embodiments, the exhaust plenum 1520 extends along the vertical axis $V_A$ of the enclosure 1100 between a lowermost edge 1512 of the exhaust hood 1510 and a vertical location between the cooking surface total for the appliance 1200 and the fixed floor 1120. In some embodiments, the exhaust plenum 1520 extends laterally across a width of the lateral wall 1110 (e.g., a length of the lateral wall 1110 along the lateral axis $L_A$). Accordingly, the exhaust plenum 1520 can occlude the lateral wall 1110 between the lowermost edge 1512 of the exhaust hood 1510 and the cooking surface 1204. In some embodiments, the exhaust plenum 1520 has a depth D (FIG. 6) extending along the longitudinal axis $L_{O1}$ of the enclosure 1100. The depth D extends between the appliance 1200 and the lateral wall 1110. In some embodiments, the exhaust plenum 1520 defines an internal volume that is in the range of 125% to 200% (e.g., between 150% and 175%) of an internal volume defined by the exhaust hood 1510.

In some embodiments, the exhaust plenum 1520 is fluidly coupled to the lower and the outer duct of the exhaust assembly 1500. As such, the blower is fluidically coupled to the exhaust hood 1510. The blower is thus configured to produce a flow of the cooking exhaust from the exhaust hood 1510, downward through the exhaust plenum 1520 and into the outer duct for discharge.

In operation, the burner unit of the appliance 1200 generates the combustion exhaust (not shown in FIGS. 4-6, but see e.g., cooking exhaust $E_2$ as depicted in FIG. 7). The combustion exhaust includes heat and combustion byproducts resulting from the generation of heat by the burner unit. As depicted in FIG. 6, in some embodiments, the exhaust assembly 1500 includes a combustion-exhaust duct 1560. One end of the combustion-exhaust a 1560 can be coupled to a combustion-exhaust port 1230 defined by the rear face 1206 of the appliance 1200. In some embodiments, the combustion-exhaust port 1230 is positioned vertically between the cooking surface 1204 of the appliance 1200 and the fixed floor 1120. In other words, the combustion-exhaust port is lower than the cooking surface 1204. Additionally, the combustion-exhaust duct 1560 can, for example, be coupled to a combustion-exhaust coupling port 1524 defined by the exhaust plenum 1520. In some embodiments, the combustion-exhaust coupling port 1524 is positioned along the vertical axis $V_A$ between the cooking surface 1204 and the fixed floor 1120. The combustion-exhaust coupling port 1524 is configured to facilitate fluidically coupling the appliance 1200 to the remainder of the exhaust assembly (e.g., an inner duct, as described herein. For example, in some embodiments the combustion-exhaust coupling port 1524 and/or the combustion-exhaust duct 1560 are configured to fluidically couple the appliance 1200 to an inner duct that allows the combustion exhaust to be conveyed outside of the service volume $S_V$ and through the mechanical volume My. In some embodiments, the inner duct of the exhaust assembly 1500 is positioned within the outer duct and is configured to be fluidly coupled to the burner unit of the appliance 1200 such that the combustion exhaust can flow through the inner duct.

Any of the deployable kitchens described herein (including the deployable kitchen 1000) can include an exhaust assembly configured to receive a cooking exhaust and a combustion exhaust from an appliance within the enclosure of the deployable kitchen. For example, FIG. 7 is a side view schematic illustration of a portion of a deployable kitchen 2000 that has an appliance 2200 in fluid communication with an exhaust assembly 2500. The deployable kitchen 2000 includes an enclosure 2100, similar to the enclosure 1100, within which the appliance 2200 is contained. The enclosure 2100 includes a fixed floor 2120 and a fixed roof 2122. The enclosure 2100 defines a longitudinal axis $L_{O1}$, a lateral axis (not shown), and a vertical axis $V_A$. The deployable kitchen 2000 includes a lateral wall 2110 within the enclosure 2100. The lateral wall 2110 extends between the fixed floor 2120 and the fixed roof 2122 to at least partially define a mechanical volume My within the enclosure 2100 that is separate from a service volume $S_V$ within the enclosure 2100.

The appliance 2200 includes an appliance housing 2202 that contains a burner unit 2210. Additionally, as shown, the appliance housing 2202 includes a cooking surface 2204, a front face 2208, a rear face 2206, and two side faces. The burner unit 2210 can be any suitable burner unit that combusts fuel to produce heat. For example, in some embodiments, the burner unit 2210 (and any of the burner units described herein) can be an atomization burner that employs low pressure air to facilitate atomization of the liquid fuel. Such burners can include, for example, the AIRTRONIC™ burner produced by Babington Technology, Inc., which is disclosed in U.S. Pat. No. 10,322,661 entitled "Mobile Kitchen," and U.S. Pat. No. 7,798,138 entitled "Convention Oven Indirectly Heated by a Fuel Burner," each of which is incorporated herein by reference in its entirety. The burner unit 2210 (and any of the burners disclosed herein) can also include the FLEXIFRE™ burner produced by Babington Technology, Inc., which is disclosed in U.S. Pat. No. 11,105,504 entitled "Atomization Burner with Flexible Fire Rate," which is incorporated herein by reference in its entirety. The burner unit 2210 is enclosed within the appliance housing 2202 of the appliance, and thus the appliance 2200 is a closed burner system that allows the combustion gas to be exhausted according to any of the plenums or duct systems described herein.

As depicted in FIG. 7, the deployable kitchen 2000 includes an exhaust assembly 2500 positioned at least partially within the enclosure 2100. The exhaust assembly 2500 is configured to receive a cooking exhaust $E_1$ and a combustion exhaust $E_2$ from the appliance 2200 within the enclosure 2100. The exhaust assembly 2500 includes an exhaust hood 2510, an exhaust plenum 2520, a blower 2530, an outer duct 2540, and an inner duct 2550. The exhaust hood 2510 is coupled along the lateral wall 2110 and is configured to receive the cooking exhaust $E_1$. The exhaust hood 2510 defines a longitudinal axis that is parallel to the lateral axis of the enclosure 2100. The exhaust hood 2510 has a lowermost edge 2512 that is the portion of the exhaust hood 2510 that is closer to the fixed floor 2120 of the enclosure 2100 than any other portion of the exhaust hood 2510. Although the exhaust hood 2510 is shown as being angled (i.e., the surface having vents through which the cooking exhaust can flow is nonparallel to the fixed roof 2122), in other embodiments, the exhaust hood 2510 can have any suitable shape. For example, in some embodiments, any of the exhaust hoods can be rectangular shaped such that the vents through which the cooking exhaust can flow is substantially parallel to the fixed roof 2122 and/or the cooking surface 2204.

The exhaust plenum 2520 is also coupled along the lateral wall 2110 and is in fluid communication with the exhaust hood 2510. The exhaust plenum 2520 is positioned between the exhaust hood 2510 and the fixed floor 2120. Said another way, the exhaust plenum 2520 is positioned vertically below the exhaust hood 2510. In some embodiments, the exhaust plenum 2520 and the exhaust hood 2510 are positioned along the first face 2112 of the lateral wall 2110. The exhaust plenum 2520 is in fluid communication with the exhaust hood 2510. Accordingly, the exhaust plenum 2520 facilitates a flow of the cooking exhaust in a downward direction toward the fixed floor 2120 after being received by exhaust hood 2510, as shown by the arrow $FP_{1b}$. Additionally, an inlet 2532 of the blower 2530 is fluidically coupled to the exhaust hood 2510. For example, the inlet 2532 can be fluidically coupled to the exhaust hood 2510 via the exhaust plenum 2520. An outlet 2534 of the blower 2530 is fluidically coupled to the outer duct 2540. As such, the blower 2530 is configured to produce a flow of the cooking exhaust $E_1$ through the outer duct 2540.

In some embodiments, the outer duct 2540 is positioned along the vertical axis $V_A$ of the enclosure 2100 between the lowermost edge 2512 of the exhaust hood 2510 and the fixed floor 2120. More specifically, in some embodiments, the outer duct is positioned along the vertical axis between the lowermost edge 2512 of the exhaust hood 2510 and the cooking surface 2204 of the appliance 2200. Said another way, the outer duct 2540 is vertically below all portions of the exhaust hood 2510, and, in some embodiments, can be between the exhaust hood 2510 and the cooking surface 2204. As such, in operation, the cooking exhaust $E_1$ is directed vertically downward from the exhaust hood 2510 to vent the cooking exhaust $E_1$ from the service volume $S_V$. Positioning the outer duct 2540 below all portions of the exhaust hood 2510 can preserve headspace within the enclosure. The unobstructed headspace can then be used for other functions of the deployable kitchen 2000. For example, in some embodiments, the unobstructed headspace can be used for an environmental control unit, ducting, lighting, storage, or other functions of the deployable kitchen 2000 that increase the usability of the deployable kitchen.

In some embodiments, the longitudinal axis $L_{O1}$ and the vertical axis $V_A$ of the enclosure 2100 define a first plane.

The outer duct 2540 extends parallel to the first plane along a second plane that is orthogonal to the first plane. However, the second plane has an angle of inclination relative to the fixed floor 2120 along the longitudinal axis $L_{O1}$ of zero degrees to ten degrees. Said another way, the outer duct 2540 can be a linear structure that extends generally along the longitudinal axis $L_{O1}$ of the enclosure 2100 on a slope, which results in the vertical height of the outer duct 2540 increasing relative to the fixed floor 2120 as a distance from the appliance 2200 increases longitudinally. The incline of the outer duct 2540 relative to the fixed floor 2120 can, in some embodiments, be ten degrees or less. However, in some embodiments, the outer duct 2540 can be parallel to the fixed floor 2120 (e.g., having angle of incline of zero degrees).

In some embodiments, the exhaust hood 2510, the exhaust plenum 2520, the blower 2530, and the outer duct 2545 define a cooking-exhaust flow path $FP_1$. The cooking-exhaust flow path $FP_1$ can have several portions to route the cooking exhaust in the desired manner out of the service volume $S_V$. Specifically, as shown, a first path portion $FP_{1a}$ of the cooking-exhaust flow path $FP_1$ is within the exhaust hood 2510. A second path portion $FP_{1b}$ of the cooking-exhaust flow path $FP_1$ is within the exhaust plenum 2520. As depicted, the second path portion $FP_{1b}$ extends downward from the first path portion $FP_{1a}$ toward the inlet 2532 of the blower 2530. A third path portion $FP_{1c}$ is within the blower 2530 and a fourth path portion $FP_{1d}$ is within the outer duct 2540. The fourth path portion $FP_{1d}$ of the cooking-exhaust flow path $FP_1$ extends in the longitudinal direction from the outlet 2534 of the blower 2530.

In some embodiments, the inner duct 2550 is within the outer duct 2540 and is configured to be fluidically coupled to the burner unit 2210 within the appliance 2200. Accordingly, the inner duct 2550 is configured such that the combustion exhaust $E_2$ flows through the inner duct 2550 when the appliance 2200 is in operation. The combustion exhaust $E_2$ is separated from the cooking exhaust $E_1$ by the components of the exhaust assembly 2500 as described herein. In some embodiments, the inner duct 2550 and the outer duct 2540 are arranged in a nested configuration. In some embodiments, the inner duct 2550 and the outer duct 2540 are axially aligned. In other embodiments, however, the inner duct 2550 and the outer duct 2540 can be side-by-side (i.e., such that the inner duct 2550 is not nested within the outer duct 2540).

In some embodiments, the exhaust assembly 2500 includes a combustion-exhaust duct 2560. The combustion-exhaust duct 2560 is configured to fluidically couple the appliance 2200 and the inner duct 2550. In some embodiments, the combustion-exhaust duct 2560 is directly coupled between the appliance 2200 (e.g., at a combustion-exhaust port 2230 defined by a rear face 2206 of the appliance 2200) and the inner duct 2550. In other words, the combustion-exhaust duct 2560 can be routed along the first face 2112 of the lateral wall 2110 at least partially within the exhaust plenum 2520 between the appliance 2200 and the inner duct 2550. However, in some embodiments, the exhaust plenum 2520 defines a combustion-exhaust coupling port 2524. The combustion-exhaust coupling port 2524 is configured to facilitate fluidically coupling the appliance 2200 and the inner duct 2550. As such, the combustion-exhaust duct 2560 can be fluidically coupled to the inner duct 2550 via the combustion-exhaust coupling port 2524.

As depicted, the inner duct 2550 or the combustion-exhaust duct 2560 and the inner duct 2550 define a combustion-exhaust flow path $FP_2$. The combustion-exhaust flow path $FP_2$ is at least partially surrounded by the cooking-exhaust flow path $FP_1$ along a length of the combustion-exhaust flow path $FP_2$. The combustion exhaust $E_2$ within the portion of the combustion-exhaust flow path $FP_2$ within the inner duct 2550 is parallel to and has the same direction of flow as the cooking exhaust $E_1$ within the fourth path portion $FP_{1d}$. In some embodiments at least 60% of the length of the combustion-exhaust flow path $FP_2$ is surrounded by the cooking-exhaust flow path $FP_1$. In some embodiments at least 75% of the length of the combustion-exhaust flow path $FP_2$ is surrounded by the cooking-exhaust flow path $FP_1$. However, in some embodiments, at least 90% of the length of the combustion-exhaust flow path $FP_2$ is surrounded by the cooking-exhaust flow path $FP_1$. As such, the cooking-exhaust flow path $FP_1$ is configured to insulate the combustion-exhaust flow path $FP_2$. Said another way the portion of the cooking exhaust $E_1$ within the cooking-exhaust flow path FP has a first temperature, while the portion of the combustion exhaust $E_2$ within the combustion-exhaust flow path $FP_2$ has a second temperature. The second temperature (e.g., in the range of 400° F. to 750° F., such as in the range of 450° F. to 550° F.) is greater than the first temperature (in the range of 100° F. to 200° F.). As such, the lower temperature of the cooking exhaust $E_1$ serves to insulate the enclosure 2100 (e.g., the mechanical volume $M_V$) from the higher temperature of the combustion exhaust $E_2$. This arrangement prevents the surface of the inner duct 2550 from being directly exposed within the mechanical volume $M_V$, thereby decreasing the likelihood that service personnel working within the mechanical volume $M_V$ will be burned.

In some embodiments, the blower 2530 can be a centrifugal blower, a positive displacement blower, or any other suitable blower configured to produce a flow of the cooking exhaust $E_1$ through the outer duct 2540. As depicted, in some embodiments, the blower 2530 is positioned along the vertical axis $V_A$ between the lowermost edge 2512 of the exhaust hood 2510 and the fixed floor 2120. Accordingly, the blower 2530, being vertically lower than the exhaust hood 2510 can draw a portion of the cooking exhaust E downward through the exhaust plenum 2520 and into the outer duct 2540 positioned within the mechanical volume $M_V$. In some embodiments, the blower 2530 is positioned externally relative to the exhaust plenum 2520 and the outer duct 2540. Said another way, in some embodiments the blower 2530 is positioned along a second face 2114 of the lateral wall 2110, with the second face 2114 being separated from the first face 2112 of the lateral wall 2110 by a thickness T of the lateral wall 2110 along the longitudinal axis $L_{O1}$ of the enclosure 2100. Similarly stated, in some embodiments, the blower 2530 can be within the mechanical volume $M_V$.

In some embodiments, the exhaust assembly 2500 includes an exhaust outlet 2504. The exhaust outlet 2504 is defined by the inner duct 2550 and the outer duct 2540. The exhaust outlet 2504 is configured to discharge the cooking exhaust $E_1$ and the combustion exhaust $E_2$ from the exhaust assembly 2500. As depicted, in some embodiments, the exhaust outlet 2504 is positioned within the mechanical volume My of the enclosure 2100. In other words, the exhaust outlet 2504 is positioned along the vertical axis $V_A$ between the fixed roof 2122 and the fixed floor 2120. In some embodiments, the exhaust outlet 2504 is more specifically positioned along the vertical axis $V_A$ between the lowermost edge 2512 of the exhaust hood 2510 and the fixed floor 2120.

Figure 8:
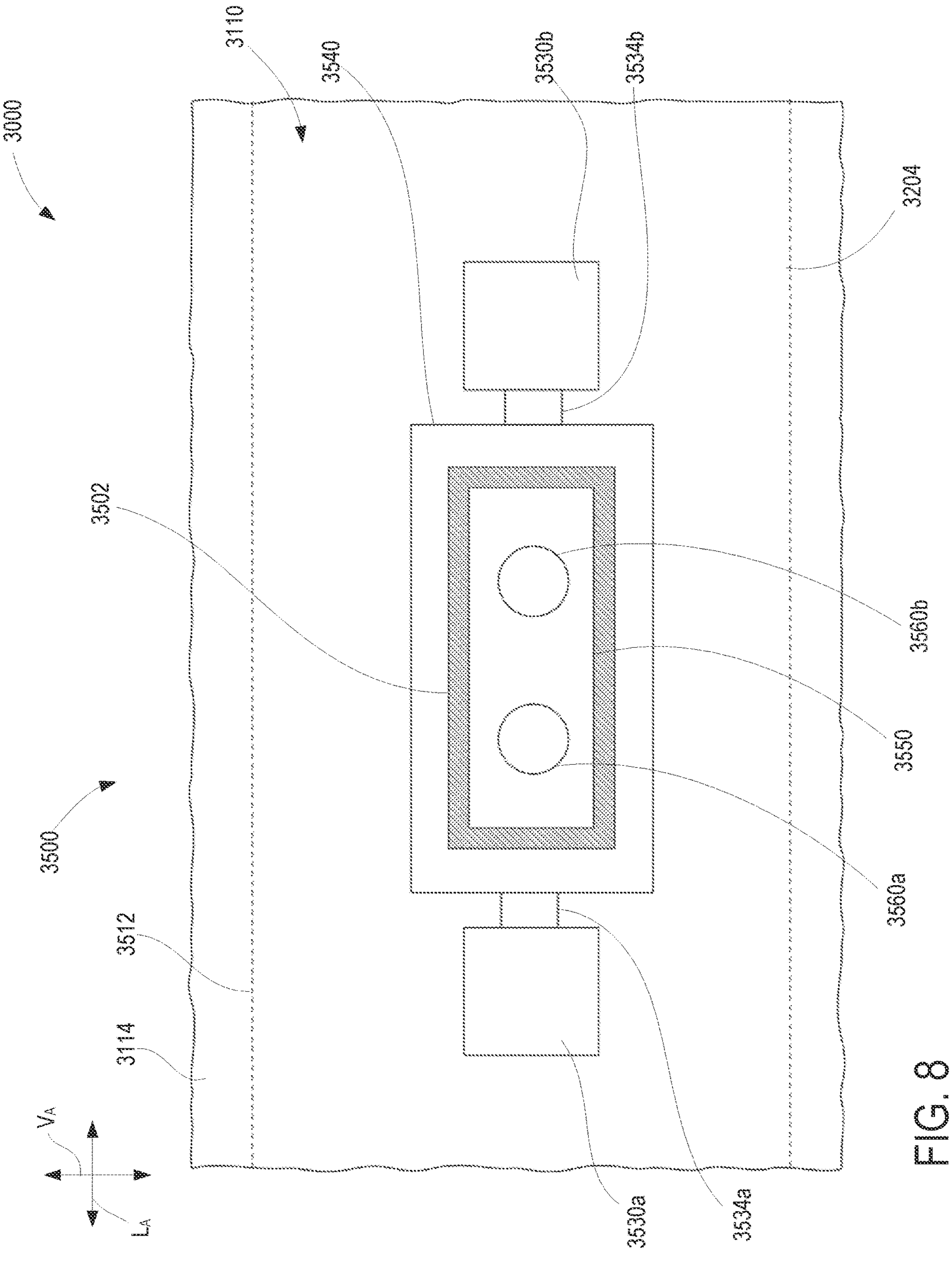
FIG. 8 is an end view schematic illustration of a portion of an exhaust assembly of a deployable kitchen illustrating a nested configuration of ducts according to an embodiment.

Any of the deployable kitchens described herein (including the deployable kitchen 1000 and 2000) can include an exhaust assembly that includes nested ducts. For example, FIG. 8 is an end view schematic illustration of a portion of an exhaust assembly 3500 of a deployable kitchen 3000 illustrating a nested configuration of ducts (e.g., an outer duct 3540 and an inner duct 3550). The deployable kitchen 3000 is configured to transition between a first (undeployed) configuration and a second configuration (deployed), similar to the deployable kitchen 1000 described above. The deployable kitchen 3000 can include any of the structures, elements, and/or features described herein with reference to deployable kitchen 1000 and/or deployable kitchen 2000. Accordingly, the enclosure of the deployable kitchen 3000 defines a longitudinal axis, a lateral axis $L_A$, and a vertical axis $V_A$. The enclosure includes a fixed floor, a fixed roof, and a lateral wall 3110 that at least partially define a service volume and a mechanical volume separated by the lateral wall 3110. As such, the end view of FIG. 8 is a view of a portion of the second face 3114 of the lateral wall 3110 from the mechanical volume of the enclosure in the direction viewing from the mechanical volume towards the service volume of the enclosure.

The deployable kitchen 3000 includes the exhaust assembly 3500 within the enclosure. The exhaust assembly 3500 can include any of the structures, elements, and such will features described herein with reference to the exhaust assembly 1500 and/or the exhaust assembly 2500. The exhaust assembly 3500 of FIG. 8 is depicted as being configured to be fluidically coupled to at least two appliances (e.g., the first appliance 1200*a* and the second appliance 1200*b* of FIG. 4). The exhaust assembly 3500 includes an exhaust hood (e.g., exhaust hood 2510), an exhaust plenum (e.g., exhaust plenum 2520), two blowers (depicted as a first blower 3530*a* and a second blower 3530*b*), and an outer duct 3540 and an inner duct 3550. The exhaust hood (not shown) is coupled along the lateral wall 3110 and is configured to receive a cooking exhaust from the appliances. The exhaust plenum (not shown) is in fluid communication with the exhaust hood and is also coupled along the lateral wall 3110 between the exhaust hood and the fixed floor. The inner duct 3550 is within the outer duct 3540 and is configured to be fluidly coupled to the burner units of the appliances within the enclosure such that combustion exhaust flows through the inner duct when the appliances are in operation. An inlet of each blower 3530*a*, 3530*b* is fluidly coupled to the exhaust hood via the exhaust plenum. An outlet of each blower (depicted as a first outlet 3534*a* and a second outlet 3534*b*) is fluidly coupled to the outer duct 3540. As such, the blower(s) 3530 is configured to produce a flow of the cooking exhaust from the exhaust hood downward into the exhaust plenum and into the outer duct 3540 for discharge. As depicted, the blowers can be displaced laterally relative to the outer duct 3540. For example, the first blower 3530*a* can be positioned on a first side of a vertical centerline defined by the outer duct 3540, while the second blower 3530*b* is positioned on a second side of the vertical centerline.

As depicted in FIG. 8, the outer duct 3540 and the inner duct 3550 are positioned along the vertical axis $V_A$ between a lowermost edge 3512 of the exhaust hood and the cooking surface(s) 3204 of the appliances. In some embodiments, the inner duct 3550 and outer duct 3540 are arranged in a nested configuration as shown (also referred to as a nested-duct assembly). In the nested configuration, the inner duct 3550 and the outer duct 3540 can be axially aligned as depicted in FIG. 8. In some embodiments, the axis of the nested configuration can be positioned parallel to the longitudinal axis of the enclosure of the deployable kitchen 3000. It should be appreciated that positioning the nested duct assembly below all portions of the exhaust hood can preserve headspace within the enclosure 3100. The unobstructed headspace can then be used for other functions of the deployable kitchen 3000. For example, in some embodiments, the unobstructed headspace can be used for an environmental control unit, ducting, lighting, storage, or other functions of the deployable kitchen 3000 that increase the usability of the deployable kitchen.

In some embodiments, the inner duct 3550 and the outer duct 3540 each have a rectangular cross-section as depicted in FIG. 8. As the inner duct 3550 is positioned within the outer duct 3540, an area of the rectangular cross-section of the inner duct 3550 is less than an area of the rectangular cross-section of the outer duct 3540. For example, the area of the rectangular cross-section of the inner duct 3550 can be in a range of 35% to 50% (e.g., a range of 40% to 45%) of the area of the rectangular cross-section of the outer duct 3540. Although the inner duct 3550 and the outer duct 3540 are shown as having generally rectangular cross-sectional shapes, in other embodiments, any of the ducts, plenums or flow structures described herein can have any suitable shape (e.g., oval, circular, rectangular).

As depicted in FIG. 8, in some embodiments, the exhaust assembly 3500 includes an insulation layer 3502. The insulation layer 3502 extends longitudinally along the inner duct 3550 and surrounds the inner duct 3550. The insulation layer 3502 is positioned between the inner duct 3550 and the outer duct 3540. The insulation layer 3502 can have a thickness that is in the range of 0.75 inches to 2.25 inches. For example, in some embodiments, the insulation layer 3502 can have a thickness that is in the range of 1.75 inches to 2.25 inches, while in other embodiments, the insulation layer 3502 can have a thickness at in in the range of 0.75 inches to 1.25 inches. The insulation layer 3502 can work in conjunction with the cooking exhaust in the outer duct 3540 to insulate the combustion-exhaust flow path within the inner duct 3550. This arrangement can minimize the amount of heat transferred to the mechanical volume within the enclosure of the deployable kitchen 3000. Additionally, this arrangement can minimize the temperature of an outer surface of the nested-duct assembly, thereby reducing burn risks and increasing operator safety.

As depicted in FIG. 8, in some embodiments the exhaust assembly 3500 includes at least one combustion-exhaust duct (depicted as a first combustion-exhaust duct 3560*a* and a second combustion-exhaust duct 3560*b*). The combustion-exhaust ducts 3560*a*, 3560*b* are configured to fluidically couple the appliance(s) and the inner duct 3550. For example, the first combustion-exhaust duct 3560*a* can be routed through the exhaust plenum to couple a first appliance (e.g., the first appliance 1200*a*) to the inner duct 3550 and the second combustion-exhaust duct 3560*b* can be routed through the exhaust plenum to couple a second appliance (e.g., the second appliance 1200*b*) to the inner duct 3550.

Figure 9:
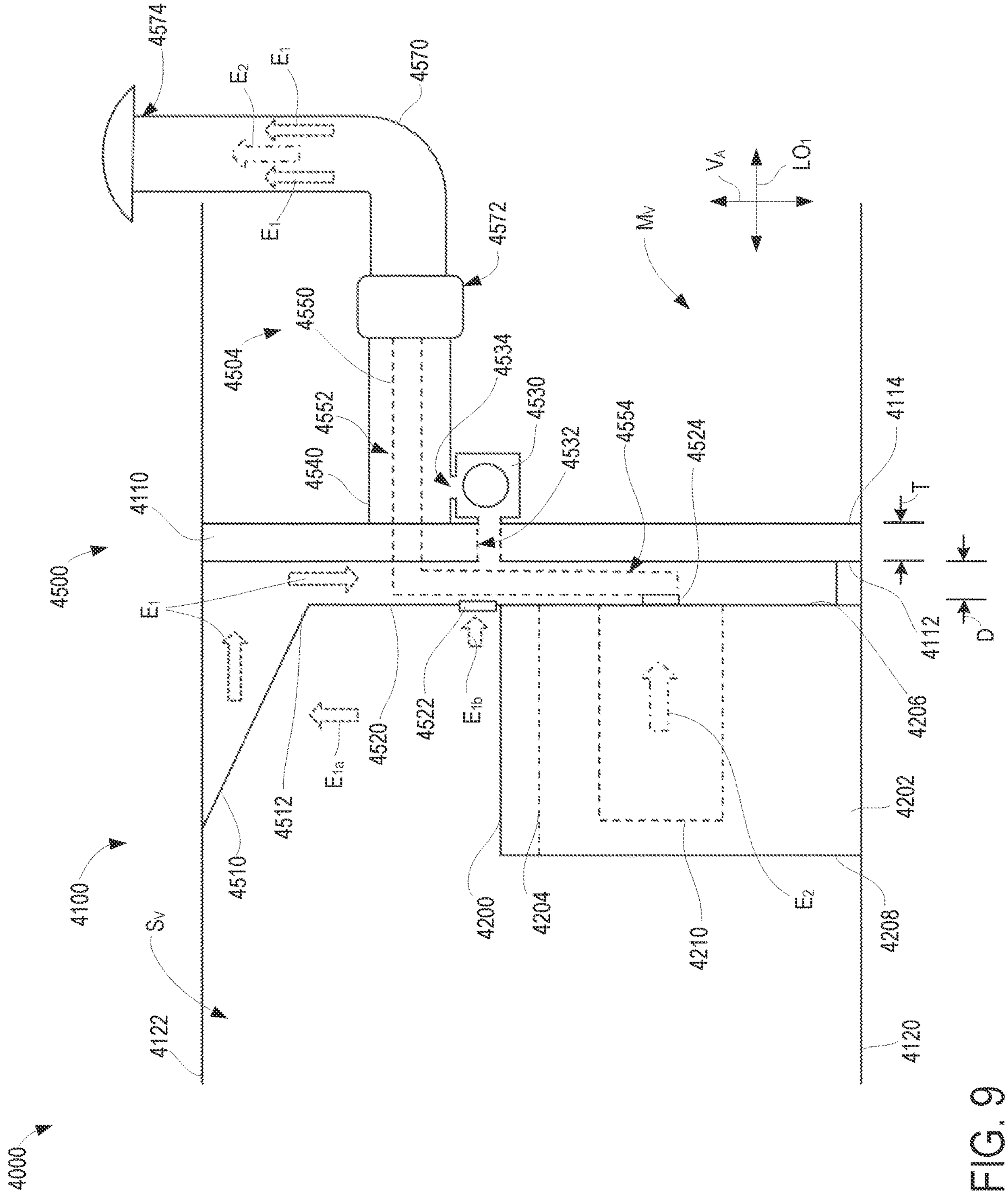
FIG. 9 is a side view schematic illustration of a portion of a deployable kitchen with an appliance fluidically coupled to an exhaust assembly according to an embodiment.

Any of the deployable kitchens described herein (including the deployable kitchen 1000, the deployable kitchen 2000, and the deployable kitchen 3000) can include an exhaust assembly configured to receive a cooking exhaust and a combustion exhaust from an appliance within the enclosure of the deployable kitchen. For example, FIG. 9 is a side view schematic illustration of a portion of a deployable kitchen 4000 that has an appliance 4200 in fluid communication with an exhaust assembly 4500. The deployable kitchen 4000 includes an enclosure 4100, similar to the enclosure 1100 within which the appliance 4200 is contained. The enclosure 4100 includes a fixed floor 4120 and a fixed roof 4122. The enclosure 4100 defines a longitudinal axis $L_{O1}$, a lateral axis (not shown), and a vertical axis $V_A$. The deployable kitchen 4000 includes a lateral wall 4110 within the enclosure 4100. The lateral wall 4110 extends between the fixed floor 4120 and the fixed roof 4122 to at least partially define a mechanical volume My within the enclosure 4100 that is separate from a service volume $S_V$ within the enclosure 4100.

The appliance 4200 includes an appliance housing 4202 that contains a burner unit 4210. Additionally, as shown, the appliance housing 4202 includes a cooking surface 4204, a front face 4208, a rear face 4206, and two side faces. The burner unit 4210 can be any suitable burner unit that combusts fuel to produce heat. For example, in some embodiments, the burner unit 4210 (and any of the burner units described herein) can be an atomization burner that employs low pressure air to facilitate atomization of the liquid fuel. Such burners can include, for example, the AIRTRONIC™ burner produced by Babington Technology, Inc., which is disclosed in U.S. Pat. No. 10,322,661 entitled "Mobile Kitchen," and U.S. Pat. No. 7,798,138 entitled "Convention Oven Indirectly Heated by a Fuel Burner," each of which is incorporated herein by reference in its entirety. The burner unit 4210 (and any of the burners disclosed herein) can also include the FLEXIFRE™ burner produced by Babington Technology, Inc., which is disclosed in U.S. Pat. No. 11,105,504 entitled "Atomization Burner with Flexible Fire Rate," which is incorporated herein by reference in its entirety. The burner unit 4210 is enclosed within the appliance housing 4202 of the appliance, and thus the appliance 4200 is a closed burner system that allows the combustion gas to be exhausted according to any of the plenums or duct systems described herein.

As depicted in FIG. 9, the deployable kitchen 4000 includes an exhaust assembly 4500 positioned at least partially within the enclosure 4100. The exhaust assembly 4500 is configured to receive a cooking exhaust $E_1$ and a combustion exhaust $E_2$ from the appliance 4200 within the enclosure 4100. The exhaust assembly 4500 includes an exhaust hood 4510, an exhaust plenum 4520, a blower 4530, an outer duct 4540, and an inner duct 4550. The exhaust hood 4510 is coupled along the lateral wall 4110 and is configured to receive the cooking exhaust $E_1$. The exhaust hood 4510 defines a longitudinal axis that is parallel to the lateral axis of the enclosure 4100. The exhaust hood 4510 has a lowermost edge 4512 that is the portion of the exhaust hood 4510 that is closer to the fixed floor 4120 of the enclosure 4100 than any other portion of the exhaust hood 4510.

The exhaust plenum 4520 is also coupled along the lateral wall 4110 and is in fluid communication with the exhaust hood 4510. The exhaust plenum 4520 is positioned between the exhaust hood 4510 and the fixed floor 4120. Said another way, the exhaust plenum 4520 is positioned vertically below the exhaust hood 4510. As depicted in FIG. 9, the exhaust plenum 5420, extends along the vertical axis $V_A$ between the lowermost edge 4512 of the exhaust hood 4510 and a vertical location that is between the cooking surface 4204 of the appliance 4200 and the fixed floor 4120. The exhaust plenum 4520 can extend laterally across the width of the lateral wall 4110 such that the exhaust plenum 4520 can occlude the lateral wall 4110 between the lowermost edge 4512 of the exhaust hood 4510 and the cooking surface 4204. The exhaust plenum 4520 can have a depth D that extends along the longitudinal axis $L_{O1}$ between the appliance 4200 and lateral wall 4110.

In some embodiments, the exhaust plenum 4520 and the exhaust hood 4510 are positioned along the first face 4112 of the lateral wall 4110. The exhaust plenum 4520 is in fluid communication with the exhaust hood 4510. Accordingly, the exhaust plenum 4520 facilitates a flow of the cooking exhaust in a downward direction toward the fixed floor 4120 after being received by exhaust hood 4510. Additionally, an inlet 4532 of the blower 4530 is fluidically coupled to the exhaust hood 4510. For example, the inlet 4532 can be fluidically coupled to the exhaust hood 4510 via the exhaust plenum 4520. An outlet 4534 of the blower 4530 is fluidically coupled to the outer duct 4540. As such, the blower 4530 is configured to produce a flow of the cooking exhaust $E_1$ through the outer duct 4540.

In some embodiments, the outer duct 4540 is positioned along the vertical axis $V_A$ of the enclosure 4100 between the lowermost edge 4512 of the exhaust hood 4510 and the fixed floor 4120. More specifically, in some embodiments, the outer duct is positioned along the vertical axis between the lowermost edge 4512 of the exhaust hood 4510 and the cooking surface 4204 of the appliance 4200. Said another way, the outer duct 4540 is vertically below all portions of the exhaust hood 4510, and, in some embodiments, can be between the exhaust hood 4510 and the cooking surface 4204. As such, in operation, the cooking exhaust $E_1$ is directed vertically downward from the exhaust hood 4510 to vent the cooking exhaust $E_1$ from the service volume $S_V$.

In some embodiments, the exhaust hood 4510, the exhaust plenum 4520, the blower 4530, and the outer duct 4545 a cooking-exhaust flow path. A first path portion of the cooking-exhaust flow path is within the exhaust hood 4510. A second path portion of the cooking-exhaust flow path is within the exhaust plenum 4520. The second path portion extends downward from the first path portion toward the inlet 4532 of the blower 4530. A third path portion is within the blower 4530 and a fourth path portion is within the outer duct 4540. The fourth path portion of the cooking-exhaust flow path extends in the longitudinal direction from the outlet 4534 of the blower 4530.

In some embodiments, the exhaust plenum 4520 defines a secondary intake portion 4522. The secondary intake portion 4522 is positioned between the cooking surface 4204 of the appliance 4200 and the lowermost edge 4512 of the exhaust hood 4510. Said another way, the secondary intake portion 4522 can be positioned adjacent to the cook surface 4204. The secondary intake portion 4522 is configured to receive a portion of the cooking exhaust $E_1$ in lieu of the portion being received by the exhaust hood 4510. In other words, a first cooking-exhaust portion Ela can be received by the exhaust hood 4510 while a second cooking-exhaust portion $E_{1b}$ is received by the exhaust plenum 4520 via the secondary intake portion 4522.

As depicted in FIG. 9, the inner duct 4550 of the exhaust assembly 4500 is within the outer duct 4540 and is configured to be fluidically coupled to the burner unit 4210 within the appliance 4200. Accordingly, the inner duct 4550 is configured such that the combustion exhaust $E_2$ flows through the inner duct 4550 when the appliance 4200 is in operation. The combustion exhaust $E_2$ is separated from the cooking exhaust $E_1$ by the components of the exhaust assembly 4500 as described herein. In some embodiments, the inner duct 4550 and the outer duct 4540 are arranged in a nested configuration. In some embodiments, the inner duct 4550 and the outer duct 4540 are axially aligned.

In some embodiments, the exhaust plenum 4520 defines a combustion-exhaust coupling port 4524. The combustion-exhaust coupling port 4524 is configured to facilitate fluidically coupling the appliance 4200 and the inner duct 4550. Accordingly, the combustion-exhaust coupling port 4524 can be positioned along the vertical axis $V_A$ between the cooking surface 4204 and the fixed floor 4120. Said another way, the combustion-exhaust coupling port 4524 can be positioned vertically to align with a combustion-exhaust port of the appliance 4200.

As depicted in FIG. 9, in some embodiments the exhaust plenum 4520 extends vertically between the lowermost edge 4512 of the exhaust hood 4510 to a vertical position that is adjacent to the fixed floor 4120. In such an embodiment, the inner duct 4550 includes a first duct portion 4552. The first duct portion 4552 extends parallel to the outer duct 4540. The inner duct 4550 also includes a second duct portion 4554. The second duct portion 4554 is coupled to the first duct portion 4552 at a non-zero angle (e.g., via a 90-degree curved portion). The second duct portion 4554 extends within the exhaust plenum 4520 toward the fixed floor 4120 as depicted. As such, the second duct portion 4554 can be coupled to the combustion-exhaust coupling port 4524 to facilitate fluid coupling with the appliance 4200.

In some embodiments, the inner duct 4550 defines a combustion-exhaust flow path. The combustion-exhaust flow path is surrounded by the cooking-exhaust flow path along a length of the combustion-exhaust flow path. The combustion exhaust $E_2$ within the portion of the combustion-exhaust flow path within the inner duct 4550 is parallel to and has the same direction of flow as the cooking exhaust $E_1$ within the outer duct 4540. In some embodiments at least 75% of the length of the combustion-exhaust flow path is surrounded by the cooking-exhaust flow path. However, in some embodiments, at least 90% of the length of the combustion-exhaust flow path is surrounded by the cooking-exhaust flow path. As such, the cooking-exhaust flow path is configured to insulate the combustion-exhaust flow path. Said another way the portion of the cooking exhaust $E_1$ within the cooking-exhaust flow path has a first temperature, while the portion of the combustion exhaust $E_2$ within the combustion-exhaust flow path has a second temperature. The second temperature (e.g., in the range of 450° F. to 550° F.) is greater than the first temperature (in the range of 100° F. to 200° F.). As such, the lower temperature of the cooking exhaust $E_1$ serves to insulate the enclosure 4100 (e.g., the mechanical volume $M_V$) from the higher temperature of the combustion exhaust $E_2$.

In some embodiments, the blower 4530 can be a centrifugal blower, a positive displacement blower, or any other suitable blower configured to produce a flow of the cooking exhaust $E_1$ through the outer duct 4540. As depicted, in some embodiments, the blower 4530 is positioned along the vertical axis $V_A$ between the lowermost edge 4512 of the exhaust hood 4510 and the fixed floor 4120. Accordingly, the blower 4530, being vertically lower than the exhaust hood 4510 can draw a portion of the cooking exhaust $E_1$ downward through the exhaust plenum 4520 and into the outer duct 4540 positioned within the mechanical volume $M_V$. In some embodiments, the blower 4530 is positioned externally relative to the exhaust plenum 4520 and the outer duct 4540. Said another way, in some embodiments the blower 4530 is positioned along a second face 4114 of the lateral wall 4110, with the second face 4114 being separated from the first face 4112 of the lateral wall 4110 by a thickness T of the lateral wall 4110 along the longitudinal axis $L_{O1}$ of the enclosure 4100.

In some embodiments, the exhaust assembly 4500 includes an exhaust outlet 4504. The exhaust outlet 4504 is defined by the inner duct 4550 and the outer duct 4540. The exhaust outlet 4504 is configured to discharge the cooking exhaust $E_1$ and the combustion exhaust $E_2$ from the exhaust assembly 4500. In some embodiments, the exhaust outlet 4504 is positioned within the mechanical volume My of the enclosure 4100. In other words, the exhaust outlet 4504 is positioned along the vertical axis $V_A$ between the fixed roof 4122 and the fixed floor 4120. In some embodiments, the exhaust outlet 4504 is more specifically positioned along the vertical axis $V_A$ between the lowermost edge 4512 of the exhaust hood 4510 and the fixed floor 4120.

In some embodiments, the exhaust assembly 4500 includes an outlet extension 4570. The outlet extension 4570 is removably coupled to the exhaust outlet 4504. As such, the outlet extension 4570 has an extension inlet 4572 that is configured to be in fluid communication with the exhaust outlet 4504. The outlet extension 4570 also has an extension outlet 4574 that is positioned outside of the enclosure 4100. As such, the outlet extension 4570 can be used to transition a point of discharge of the cooking exhaust $E_1$ and the combustion exhaust $E_2$ from within the mechanical volume $M_V$ to a point in the exterior volume surrounding the enclosure 4100.

The components of any of the deployable kitchens described herein can be constructed from any suitable material or combination of material. For example, any of the plenums, hoods, ducts, vents, nested ducts, or duct assemblies described herein can be constructed from stainless steel, aluminum, or any other metal or combination of metals that can accommodate the temperatures and conditions to which the component is exposed. In some embodiments, any of the plenums, hoods, ducts, vents, nested ducts, or duct assemblies described herein can include a surface coating formulated to reduce corrosion that may result due to exposure to water, exhaust gas constituents, or particulate emissions from cooking. In some embodiments, any of the plenums, hoods, ducts, vents, nested ducts, or duct assemblies described herein can include an insulative material.

While some embodiments have been described above, it should be understood that they have been presented by way of example only, and not limitation. Where methods and/or schematics described above indicate certain events and/or flow patterns occurring in certain order, the ordering of certain events and/or operations may be modified. While the embodiments have been particularly shown and described, it will be understood that various changes in form and details may be made.

Although some embodiments have been described as having particular features and/or combinations of components, other embodiments are possible having a combination of any features and/or components from any of embodiments as discussed above. Aspects have been described in the general context of deployable kitchens, but inventive aspects are not necessarily limited to use in deployable kitchens. For example, any of the embodiments described herein can be used in conjunction with any suitable kitchen or enclosure with heat generating appliances.

For example, in some embodiments, the exhaust assemblies described herein can be used in connection with a deployable service enclosure that contains manufacturing or fabrication equipment. Such manufacturing or fabrication equipment can include cutting tools (e.g., a lathe, a milling machine, a surface grinder, or drill press), welding equipment, metal forming equipment or the like. In such embodiments, the deployable service enclosure can include cooling systems (either air cooling or liquid cooling) to cool the equipment within the enclosure. The deployable service enclosure can also include any of the exhaust assemblies described herein to manage exhaust gases.

In some embodiments, the exhaust assemblies described herein can be used in connection with a deployable laboratory that contains various lab equipment. Such lab equipment can include burner units (as described herein), heaters for processing samples, or the like. In such embodiments, the deployable laboratory can include cooling systems (either air cooling or liquid cooling) to cool the laboratory equipment and/or exhaust assemblies to exhaust combustion products from within the enclosure. The deployable laboratory can include any of the conduits, ducts, and/or duct assemblies described herein to manage exhaust gases.

In some embodiments, the exhaust assemblies described herein can be used in connection with a deployable data center that contains various computing equipment. Such computing equipment can include burner units (as described herein), heaters for processing samples, or the like. In such embodiments, the deployable data center can include cooling systems (either air cooling or liquid cooling) to cool the data center within the enclosure. The deployable data center can also include any of the exhaust assemblies described herein to manage exhaust gases.

What is claimed is:

1. A deployable kitchen, comprising:

an enclosure having a fixed floor and a fixed roof, the enclosure defining a longitudinal axis, a lateral axis, and a vertical axis;

a lateral wall within the enclosure, the lateral wall extending between the fixed floor and the fixed roof to at least partially define a mechanical volume within the enclosure; and an exhaust assembly positioned at least partially within the enclosure, the exhaust assembly configured to receive a cooking exhaust and a combustion exhaust from an appliance within the enclosure, the exhaust assembly including an exhaust hood, an exhaust plenum, a blower, an outer duct, and an inner duct, wherein:

the exhaust hood is coupled along the lateral wall, defines a primary axis that is parallel to the lateral axis of the enclosure, and is configured to receive the cooking exhaust, the exhaust plenum is coupled along the lateral wall, is positioned between the exhaust hood and the fixed floor, and is in fluid communication with the exhaust hood, the inner duct is within the outer duct and is configured to be fluidically coupled to a burner unit within the appliance such that the combustion exhaust flows through the inner duct, an inlet of the blower is fluidically coupled to the exhaust hood, an outlet of the blower is fluidically coupled to the outer duct, and the blower is configured to produce a flow of the cooking exhaust through the outer duct.

2. The deployable kitchen of claim 1, wherein:

the longitudinal axis and the vertical axis of the enclosure define a first plane;

the outer duct extends along a second plane that is orthogonal to the first plane;

the second plane has an angle of inclination relative to the fixed floor along the longitudinal axis of zero degrees to ten degrees; and the outer duct extends parallel to the first plane.

3. The deployable kitchen of claim 1, wherein:

the outer duct is positioned along the vertical axis between a lowermost edge of the exhaust hood and the fixed floor.

4. The deployable kitchen of claim 1, wherein:

the outer duct is positioned along the vertical axis between a lowermost edge of the exhaust hood and a cooking surface of the appliance.

5. The deployable kitchen of claim 1, wherein the exhaust hood, the exhaust plenum, the blower, and the outer duct define a cooking-exhaust flow path, the cooking-exhaust flow path comprising:

a first path portion within the exhaust hood;

a second path portion within the exhaust plenum, the second path portion extending downward from first flow path portion toward the inlet of the blower;

a third path portion within the blower; and a fourth path portion within the outer duct, the fourth path portion extending in the longitudinal direction from the outlet of the blower.

6. The deployable kitchen of claim 5, wherein:

the exhaust assembly includes a combustion-exhaust duct configured to fluidically couple the appliance and the inner duct;

the combustion-exhaust duct and the inner duct define a combustion-exhaust flow path; and the combustion-exhaust flow path is surrounded by the cooking-exhaust flow path along at least 90% of a length of the combustion-exhaust flow path.

7. The deployable kitchen of claim 6, wherein:

a portion of the cooking exhaust within the cooking-exhaust flow path has a first temperature;

a portion of the combustion exhaust within combustion-exhaust flow path has a second temperature;

the second temperature is greater than the first temperature; and the cooking-exhaust flow path is configured to insulate the combustion-exhaust flow path.

8. The deployable kitchen of claim 1, wherein:

the blower is positioned along the vertical axis between a lowermost edge of the exhaust hood and the fixed floor.

9. The deployable kitchen of claim 1, wherein:

the exhaust hood and the exhaust plenum are positioned along a first face of the lateral wall;

the blower is positioned along a second face of the lateral wall; and the second face of the lateral wall is separated from the first face of the lateral wall by a thickness of the lateral wall along the longitudinal axis of the enclosure.

10. The deployable kitchen of claim 1, wherein:

the inner duct and the outer duct are arranged in a nested configuration.

11. The deployable kitchen of claim 10, wherein:

the inner duct and the outer duct are axially aligned.

12. The deployable kitchen of claim 1, wherein:

the inner duct has a rectangular cross-section;

the outer duct has a rectangular cross-section; and an area of the rectangular cross-section of the inner duct is less than an area of the rectangular cross-section of the outer duct.

13. The deployable kitchen of claim 1, wherein the exhaust assembly includes:

an exhaust outlet defined by the inner duct and the outer duct; and
the exhaust outlet is positioned within the mechanical volume.

14. The deployable kitchen of claim 13, wherein:
the exhaust outlet is positioned along the vertical axis between a lowermost edge of the exhaust hood and the fixed floor.

15. The deployable kitchen of claim 1, wherein:
the cooking exhaust received by the exhaust hood is a first cooking-exhaust portion;
the exhaust plenum defines a secondary intake portion positioned between a cooking surface of the appliance and a lowermost edge of the exhaust hood; and
the secondary intake portion is configured to receive a second cooking-exhaust portion.

16. The deployable kitchen of claim 1, wherein:
the inner duct includes a first duct portion that extends parallel to the outer duct;
the inner duct includes a second duct portion that extends within the exhaust plenum toward the fixed floor; and
the first duct portion is coupled to the second duct portion at a non-zero angle.

17. The deployable kitchen of claim 1, wherein the exhaust assembly includes:
a combustion-exhaust duct configured to fluidically couple the appliance and the inner duct.

18. The deployable kitchen of claim 1, wherein:
the exhaust plenum defines a combustion-exhaust coupling port; and
the combustion-exhaust coupling port is configured to facilitate fluidically coupling the appliance and the inner duct.

19. The deployable kitchen of claim 18, wherein:
the combustion-exhaust coupling port is between a cooking surface of the appliance and the fixed floor.

20. The deployable kitchen of claim 1, wherein:
the exhaust plenum defines an internal volume that is greater than 150% of an internal volume defined by the exhaust hood.

* * * * *